July 23, 1929.  G. PAPPADAKES  1,721,830
CONDIMENT HOLDER
Filed Oct. 27, 1928
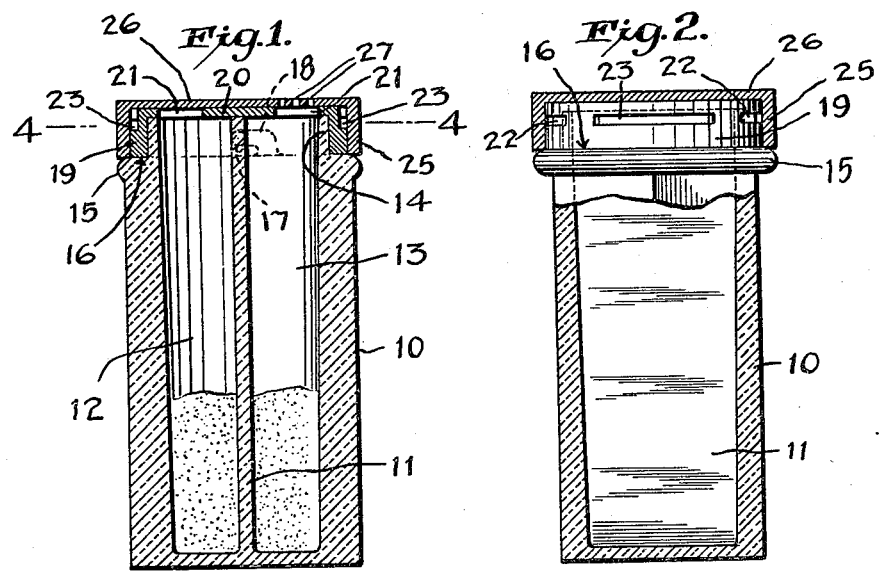
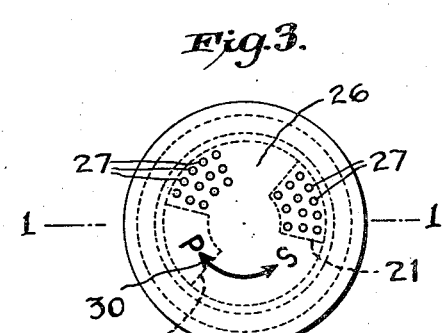
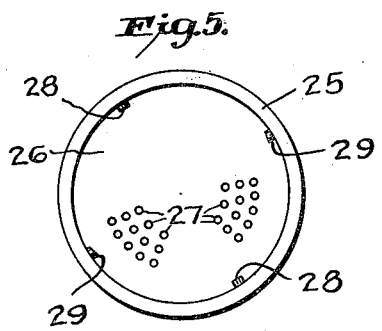
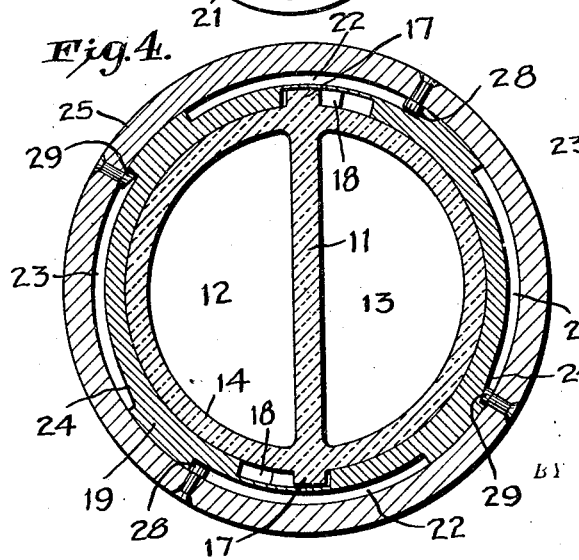
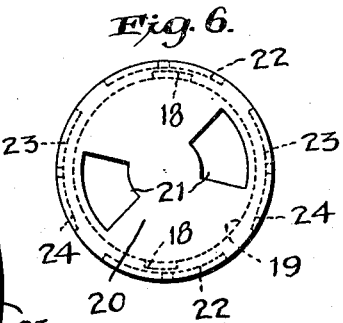
INVENTOR
Gust Pappadakes,
HIS ATTORNEY

Patented July 23, 1929.

UNITED STATES PATENT OFFICE.

GUST PAPPADAKES, OF NEW YORK, N. Y.

CONDIMENT HOLDER.

Application filed October 27, 1928. Serial No. 315,374.

The invention relates to condiment holders and has for its object to provide for the holding of two different condiments, preferably salt and pepper, in the same receptacle and permit of the distribution of either one independent of the other.

A further object is to provide a device of this nature which is of a very simple character and durable and inexpensive in construction as well as serviceable and very efficient in use.

With the foregoing and other objects in view which will be apparent as this description proceeds, the invention resides in the combination and arrangement of parts and details of construction hereinafter described and claimed and illustrated in the accompanying drawings.

Referring to said drawings:

Fig. 1 is a longitudinal sectional view taken on line 1—1 of Fig. 3;

Fig. 2 is a view taken at right angles to Fig. 1 with parts in section and parts in elevation;

Fig. 3 is a top plan view;

Fig. 4 is a cross sectional view on an enlarged scale and taken on line 4—4 of Fig. 1;

Fig. 5 is a bottom plan view of the removable sifter top; and

Fig. 6 is a top plan view of the cover member.

Referring again to the drawings the reference numeral 10 designates a condiment holder or receptacle which may be formed of glass or other suitable material and is provided with the partition 11 which divides the holder into two compartments 12 and 13. Each of these compartments is adapted to hold a condiment such as salt or pepper. A neck 14 is formed in the upper end of the holder above a flange 15 thus providing a seat 16.

The neck 14 has a pair of pins 17 formed integral therewith or suitably secured thereto. These pins cooperate with bayonet slots 18 in a skirt 19 of a cover member so as to securely hold the cover member to the holder and prevent it from being turned in relation thereto except at such times as it may be desirable to remove the cover member. The upper flat portion 20 of the cover member is provided with a pair of substantially large openings 21, one for each of the compartments 12 and 13. The skirt 19 snugly fits the neck 14 of the holder and is further provided with grooves 22, 22 and 23, 23. The grooves 23 have shallow portions 24 at one of their ends, the purpose of which will be hereinafter described.

Snugly fitting about the skirt 19 of the cover member is a skirt 25 of a sifter top. The sifter top has a flat portion 26 in which are located two sets of perforations 27, one for each of the openings 21. The sets of perforations are so arranged that when one set is positioned over one of the openings 21 the other is blanked by the flat 20 of the cover member. They are also arranged so that a minimum amount of movement is necessary to shift the sets of perforations to their respective openings.

Pins 28, 28 mounted in the skirt of the sifter top engage the grooves 22, 22 and pins 29, 29 likewise mounted in said skirt engage the grooves 23, 23. The grooves 22 and 23 are substantially the length of the amount of movement needed to shift one of the sets of perforations from its blanked position to a position over one of the openings 21, thus limiting the movement of the sifter top in either direction.

Means are provided to frictionally hold the sifter top in its proper position over either one of the compartments 13 or 14 and one of the respective openings 21 in the cover member. As illustrated this means comprises the beveling of the ends of the pins 29 so that in one position one of the pins 29 will cooperate with one of the flattened or shallow parts 24 of one of the grooves 23 and in the other position the other pin 29 will cooperate with the shallow part 24 of the other groove 23. This is particularly illustrated in Fig. 4.

Suitable indicating means such as shown at 30 in Fig. 3 may be provided so that one may be enabled to readily tell which of the condiments he desires to use.

From the foregoing it is thought the operation of the device will be clear.

The inner sides of the holder taper toward the bottom so that the tendency of the condiments to stick in the holder will be considerably lessened.

I claim:

1. A condiment holder having a body the inner sides of which taper toward the bottom, a partition wall in the body adapted to form compartments therein, a cover member fitting over the open end of said compartment and having a substantially large opening for each compartment, means for securing said cover member to the open end of said body portion, a sifter top having a set of perforations for each of said openings in said cover member, said sets of perforations being so arranged that when one set is positioned over one of said openings in said cover the other set will be blanked by said cover member, and a plurality of pins on said sifter top engaging grooves in said cover member, said pins being so arranged as to limit the movement of said sifter top in either direction and one or more of said pins being arranged to cooperate with one or more of said grooves so as to frictionally hold said sifter top in either one of two positions.

2. A condiment holder having a body the inner sides of which taper toward the bottom, a partition wall in said body adapted to form two compartments therein, a cover member fitting over the open end of said compartments and comprising a flat portion and a skirt portion, said flat portion having a substantially large opening for each compartment, bayonet slots in the skirt of said cover member cooperating with pins on said body member for securing said cover member to said body member, a sifter top having a flat portion and a skirt, the flat portion having a set of perforations for each of said openings in said cover member, and a plurality of pins mounted in said skirt of said sifter top and engaging grooves in said skirt of said cover member, said pins being so arranged as to limit the movement of said sifter top in either direction and a pair of said grooves having shallow portions at their ends to cooperate with a pair of said pins so as to frictionally hold said sifter cap in either one of two positions.

In testimony whereof I affix my signature.

GUST PAPPADAKES.